INVENTOR.
CARL D. KEITH

United States Patent Office 3,428,424
Patented Feb. 18, 1969

3,428,424
PRODUCTION OF NITRIC ACID
Carl D. Keith, Summit, N.J., assignor to Engelhard Industries, Inc., Newark, N.J., a corporation of Delaware
Filed Feb. 24, 1965, Ser. No. 434,759
U.S. Cl. 23—162          3 Claims
Int. Cl. C01b 21/26

ABSTRACT OF THE DISCLOSURE

The oxidation of ammonia to produce nitric oxide is effected in an improved process in the presence of a catalyst block comprising a porous inert unitary refractory skeletal structure having gas flow channels therethrough and a platinum group metal deposited thereon, especially on the surfaces of the gas flow channels. This process is applicable to the production of nitric acid.

---

This invention relates to the production of nitric oxide and more especially to a new and improved process and system for the production of nitric oxide by the catalytic oxidation of ammonia and, in addition, to the production of nitric acid.

In the commercial production of nitric acid, ammonia gas is mixed with an oxygen-containing gas, e.g. air, and the gas mixture passed through or over platinum metal gauze catalyst maintained at an elevated temperature in a converter to obtain nitric oxide. The effluent gas from the ammonia converter is then cooled and introduced together with additional oxygen-containing gas into absorption towers wherein the nitric oxide is oxidized to nitrogen dioxide and the nitrogen dioxide is absorbed in water to form nitric acid. The platinum metal gauze is usually of a platinum-rhodium alloy and in the form of a fine gauze packed in numerous layers, typically 10–30 gauze sheets packed together.

The platinum metal gauze is heated at high temperatures of about 650° C. to 1000° C. and higher for the ammonia oxidation and the pressure for the oxidation varies from atmospheric pressure to about 110 p.s.i.g. and higher. Further the catalyst in the converter for the ammonia oxidation of high capacity plants may be subjected to high gas flows as high as 1 million cubic feet and higher of the gas mixture per cubic foot of catalyst gauze per hour. Under such severe conditions of the ammonia oxidation, there is considerable loss of the expensive platinum group metal due to physical and chemical attack by the gases and the loss of catalyst is greater for converters operating at higher pressure and/or temperatures. Indeed the losses of expensive platinum metal catalyst are not infrequently as high as 2.2 troy ounces per 100,000 lbs. avoirdupois of ammonia oxidized in the converter.

Further, with the catalytic metal gauze packed in numerous layers in the reaction zone, material gas back pressures tend to develop which are undesirable. Moreover, it is difficult to maintain constant temperature in the gauze. The shell of such catalyst unit is heat conductive and a temperature gradient is set up in the bed. The difficulty of temperature control presents problems with respect to the expensive Pt-Rh catalyst. If the temperature is too high, precious metal losses increase sharply even under atmospheric pressure. Hot spots in the gauze cause holes through which the gases channel unconverted. In operation the gauze darkens appreciably and quite large excrescences of low mechanical strength form on the wires. These excrescences cause increased back pressure in the gauze and are partly carried away by the gas stream with loss of the expensive precious metal.

In addition to the above-mentioned problems, usually the gauze catalysts start losing their activity in a relatively short time. It is estimated that the gauze units, particularly in high pressure systems, must be regenerated about every 3 to 8 weeks. Further the gauze has a tendency to pry up, tear and sag. Replacement, repair and regeneration of the conventional catalysts causes expensive shut-downs in plant operation.

In accordance with the present invention, it has now been found that ammonia can be oxidized to produce nitric oxide by a catalytic oxidation which is considerably more economical and efficient and with appreciably less loss of catalystic metal than with the prior art process utilizing the platinum gauze catalyst, and with elimination of the material gas back pressures occurring especially after prolonged use of the metallic gauze catalyst with the gauze in numerous layers. The processs of this invention involves passing gaseous ammonia together with an oxygen-containing gas present in amount sufficient to supply molecular oxygen in at least the stoichiometric amount required to react with the ammonia to produce nitric oxide, at a reaction temperature through a plurality of gas flow channels extending in the direction of gas flow through a supported catalyst comprising a porous inert unitary solid refractory skeletal structure as support, and a platinum group metal at catalyst on surfaces of the flow channels and of superficial macropores communicating with the channels. During its passage through the flow channels, the gaseous mixture of ammonia and oxygen-containing gas contacts the platinum group metal on the flow channel surfaces and also on the surfaces of the accessible superficial macropores, with the result the ammonia is oxidized to nitric oxide. The accessible superficial macropores are predominantly of size in excess of 200 angstrom units. The platinum group metal required by the process of this invention is reduced to a low level and to as small an amount as about 1% of that required by the prior art process utilizing the platinum gauze. Further the instant process eliminates the undesirable growth of excrescences occurring on the Pt-Rh gauze of the prior art process and hence the loss of the expensive catalytic metal, and the channeling of the gases through the resulting openings in the gauze with attendant by-passing of the catalyst by unconverted gases is also eliminated by the process of this invention. The catalytic platinum group metal alloy herein is preferably deposited as a thin continuous or substantially continuous layer on the surfaces of the flow channels and of the superficial macropores communicating therewith.

The reaction conditions of temperature and pressure for the oxidation of this invention are a temperature of the catalyst of preferably about 650° C.–1000° C., and a pressure of preferably about atmospheric pressure to about 110 p.s.i.g. and higher. Space velocities may range from about 100 up to 1,000,000 cubic feet of gas per cubic foot of supported catalyst per hour and even higher, based on standard conditions of temperature and pressure.

The catalytic metal is a platinum group metal and either platinum, rhodium or iridium, or an alloy thereof with one or more other platinum group metals, for instance an alloy of Pt and Rh, of Pt and Pd, or of Pt and Ir. The catalytic metal may be present in amount, by weight, from about 1%–50% (based on total supported catalyst), preferably from about 1%–10%. A valuable advantage of the present invention over gauze catalysts for ammonia oxidation is that the restrictions in suitable platinum metal alloy proportions resulting from lack of ductility or brittleness which are applicable to the gauze catalysts are eliminated. For example, the 60% Pt 40% Rh alloy is too hard and brittle for use as gauze, but provides a favorable supported catalyst in accordance with this invention.

Alternatively, the platinum group metal is deposited on a high surface area, catalytically active refractory metal oxide, for instance activated alumina, which previously was deposited on the surfaces of the channels and of the superficial macropores communicating with the channels of the inert unitary porous skeletal support. In this embodiment, some of the catalytic metal may also be deposited directly on the skeletal support.

The oxygen-containing gas is preferably atmospheric air, although oxygen per se, or oxygen-enriched air could be utilized.

The reaction to form the nitric oxide is set forth in the following equation:

$$4NH_3 + 5O_2 \rightarrow 4NO + 6H_2O$$

The nitric oxide is then oxidized to nitrogen dioxide in the nitric acid plant which in turn is absorbed in water to form nitric acid as set forth below.

$$2NO + O_2 \rightarrow 2NO_2$$
$$3NO_2 + H_2O \rightarrow 2HNO_3 + NO$$

The inert refractory unitary skeletal structure of the present invention, onto which the catalytic metal is deposited, is an inert unitary porous solid refractory skeletal structure or block having a plurality of openings or channels therethrough in the direction of gas flow. The supported catalyst is disposed in the ammonia converter in such fashion that its unitary skeletal structure occupies approximately all of the cross-sectional area of the reaction zone, with packing between it and the reactor walls to prevent bypassing of the skeletal structure by any part of the gas stream. A plurality of parallel-situate closely fitting skeletal block or structure-supported catalysts may be disposed within the converter, if desired. Advantageously, the unitary skeletal structure is shaped to fit the reaction zone of the converter into which it is to be disposed, and the body or block support of the catalyst is placed therein lengthwise as to its cellular gas flow channels so that the gases flow through the channels during their passage through the converter.

The skeletal structure support is constructed of a substantially chemically and catalytically inert, rigid, solid porous refractory material capable of maintaining its shape and strength at high temperatures, for instance up to 1100° C. or more. It has a low thermal coefficient of expansion which is less than $6 \times 10^{-6}$ per ° C. between 30° and 700° C., and such is important for good thermal shock resistance. Further, it has a low thermal conductivity of less than .035 g. cal. cm./(sec.) (cm.$^2$) (° C.). The refractory material has a bulk density of about 0.45–1.75 grams per cubic centimeter, preferably about 0.6–1.4 gram per cubic centimeter and is unglazed and essentially entirely crystalline in form and marked by the absence of any significant amount of glassy or amorphous matrices, for instance of the type found in porcelain materials. Further, the skeletal structure has considerable accessible porosity as distinguished from the substantially non-porous porcelain utilized for electrical applications, for instance spark plug manufacture, characterized by having relatively little accessible porosity. The accessible pore volume not including the volume of the gas flow channels is generally in excess of 0.01 cubic centimeter per gram of skeletal structure, preferably between 0.03 and 0.3 cc./g.

The walls of the channels of the unitary skeletal support structures of this invention contain a multiplicity of surface macropores in communication with the channels to provide a considerably increased accessible catalyst surface, and a substantial absence of small pores for high temperature stability and strength. Whereas the superficial surface area of such structures may be of the order of 0.001 to 0.01 m.$^2$/g. including the channels, the total surface area is typically many times greater, so that much of the catalytic reaction may take place in the large pores. Typically the total accessible surface area of the support is between about 0.1 and 3 m.$^2$/g. (square meters/gram), preferably between 0.2 and 1.5 m.$^2$/g. The skeletal structure has a macropore distribution such that over 95% of the pore volume is in pores having a size, i.e. diameter, greater than 2000 angstrom units, and preferably over 50% of the pore volume is in pores having a size of over 20,000 A.

The geometric superficial or apparent surface area of the carrier including the walls of the gas flow channels will often be about 0.5 to 6, preferably 1 to 2.5, square meters per liter of support. The channels through the unitary body or skeletal structure can be of any shape and size consistent with the desired superficial surface and should be large enough to permit free passage of the gas mixture of ammonia and oxygen-containing gas. In one embodiment, the channels are generally parallel and extend through the support from one side to an opposite side, such openings being separated from one another by preferably thin walls defining the openings. In another embodiment, a network of channels permeates the body. The channels are unobstructed or substantially unobstructed to the gas flow. For most efficient operation, the channel inlet openings are distributed across essentially the entire face or cross-section of the support subject to initial contact with the gas to be reacted. The preferred skeletal structure supports of this invention are of alpha-alumina, zirconium silicate, $SiO_2 \cdot MgO \cdot Al_2O_3$ and zirconmullite. Examples of other refractory crystalline ceramic materials utilizable in place of the preferred materials as support or carrier are sillimanite, magnesium silicates, zircon, petalite, spodumene, cordierite and alumina-silicates.

The catalytically active refractory metal oxide is deposited on the unitary skeletal support in the alternative embodiment as a continuous thin deposit or as discontinuous thin deposits preferably of thickness of about 0.0004″ to 0.001″. Such catalytically active oxide is a calcined refractory metal oxide which itself is characterized by a porous structure and which possesses a large internal pore volume and total surface area. Generally, the total surface area of the active refractory metal oxide is at least about 25 square meters/gram, preferably at least about 100 square meters/gram. Such oxides can be prepared by dehydrating preferably substantially completely the hydrate form of the oxide by calcination usually at temperatures of about 150° C. to 800° C. The preferred active metal oxides contain members of the gamma or activated alumina family which can be prepared, for instance, by precipitating a hydrous alumina gel and thereafter drying and calcining to expel hydrated water and provide the active gamma-alumina. A particularly preferred active refractory metal oxide is obtained by drying and calcining at temperatures of about 300° C. to 800° C. a mixture of precursor hydrous alumina phases predominating in crystalline trihydrate, that is, containing in excess of about 50% of the total alumina hydrate composition, preferably about 65%–95%, of one or more of the trihydrate forms gibbsite, bayerite and nordstrandite by X-ray diffraction. The substantial balance of the hydrate, preferably about 35% to 5%, may be amorphous hydrous or monohydrate boehmite alumina. Calcination of the precursor hydrous alumina is preferably controlled so that the gamma-alumina obtained contains monohydrate alumina in an amount substantailly equivalent to that originally present in the mixture of the high trihydrate precursor hydrous alumina phases. Other suitable active metal oxides include for example active or calcined beryllia, zirconia, magnesia, silica, etc., and combinations of metal oxides such as boria-alumina, silica-alumina, etc. Preferably the activated refractory oxide is composed predominantly of oxides of one or more metals of Groups II, III and IV having atomic numbers not exceeding 40. The active refractory metal oxide deposit may constitute about 15 to 150 grams per liter of the unitary support, preferably about 30 to 75 grams per liter.

Providing the support with a deposit of the active refractory metal oxide of the present invention can be done in several ways. One method involves dipping the support into a solution of the salt of the refractory metal and calcining to decompose the salt to the oxide form. A more preferred method comprises dipping the support into an aqueous suspension, dispersion or slurry of the refractory oxide itself, drying and calcining. In this method, suspensions or dispersions having a solids content in the range of about 10% to 70% by weight can be used to deposit a suitable amount of an active refractory metal oxide on the support in a single application. In order to prepare a catalyst having 10% activated alumina on a zircon-mullite structure, about 20%–40% solids in the suspension is used. The percent solids is determined on an ignited weight basis (ignited at 1100° C.). In general, calcining temperatures within the range of about 150° C. to 800° C. are employed. The calcination is favorably conducted in air, for example flowing dried air, or may be carried out in contact with other gases such as oxygen, nitrogen, hydrogen, flue gas, etc., or under vacuum conditions. The refractory oxide is deposited on the surfaces of the skeletal structure including the channel surfaces and the surfaces of the superficial macropores in communication with the channel surfaces as thin deposits in an amount, by weight, of about 1% to 50% and preferably 5% to 30% based on the weight of the skeletal structure.

Application of the platinum group metal, e.g. platinum, to the skeletal support can be effected by immersing the skeletal structure with or without the refractory metal oxide deposited thereon, in an aqueous solution of a water-soluble inorganic salt of the platinum group metal, followed by agitating the mixture to assure uniform distribution, and precipitating the metal or metals typically in chemically combined state, for instance the oxide state, on the skeletal structure. The combined metal can be reduced by contacting same with a reducing gas, e.g. $H_2$, at an elevated temperature. Application of the platinum-rhodium alloy, platinum-palladium or platinum-iridium alloy to the skeletal structure support can be effected by immersing the skeletal structure with or without the deposited refractory metal oxide, in an aqueous solution of water-soluble inorganic salts of the respective metals, followed by agitating the mixture, and precipitating the metals typically in chemically combined state, for instance as oxides, on the skeletal structure. Reduction of the metal oxides on the skeletal structure support to the metals may be effected if desired by contacting the chemically combined metals on the skeletal structure with a reducing gas at a temperature between about 100° C. and 1100° C. for about an hour. The platinum-rhodium, platinum-palladium and platinum-iridium alloys herein are in general primarily or predominantly of platinum, and preferably have a rhodium, palladium or iridium content within the range, by weight, of about 2% to about 40% with the balance of the alloy being the platinum.

The gas flow channels of the unitary ceramic skeletal supported catalysts of this invention are preferably characterized by having a plurality of relatively thin-walled cellular channels passing from one surface to the opposite surface and providing a large amount of superficial surface area. The channels can be one or more of a variety of cross-sectional shapes and sizes, each channel space being defined by ceramic walls and usually such channels are separated from one another by a wall of refractory or ceramic material. The channels can be of the cross-sectional shape, for example, of trapezoids, triangles, rectangles, squares, hexagonals, sinusoids or circles so that cross-sections of the support represent a repeating pattern that can be described as a honeycomb, corrugated or lattice structure. The walls of the cellular channels are generally of the minimum thickness necessary to provide a strong unitary body. This wall thickness will usually fall in the range of about 2 to 10 mils. With this wall thickness the structures contain from about 100–2500 or more gas inlet openings for the flow channels per square inch and a corresponding number of the gas flow channels, preferably about 400–2000 gas inlet and flow channels per square inch. The size and dimensions of the unitary refractory skeletal support of this invention can be varied widely as desired. The size and shape of the support bodies is generally conformed to the desired configuration of the catalyst reactor bed.

The porous inert unitary refractory skeletal structure support providing the plurality of gas flow channels can be prepared from any of the chemically inert refractory materials previously mentioned, although zircon-mullite is preferred. Any convenient method known to the art can be employed in the preparation of the structures as, for instance, the method described in British Patent 882,484. Deposition of the catalytic metal or metal alloy and when utilized the active refractory metal oxide is accomplished as previously described. The porous inert unitary refractory skeletal structure support is also obtainable in commerce from the Minnesota Mining and Manufacturing Company.

Where more than one of the unitary refractory skeletal structure supported catalysts are used, the unitary structure supported catalysts are in a fixed and predetermined relationship to each other and to the gas flow; for example, the structures may be placed in parallel with respect to gas flow. The skeletal structure-supported catalyst of this invention is usually supported within the ammonia converter or reactor on a suitable supporting means, for instance a ceramic or metallic grid.

Reference is now made to the accompanying drawings wherein.

Figure 2:
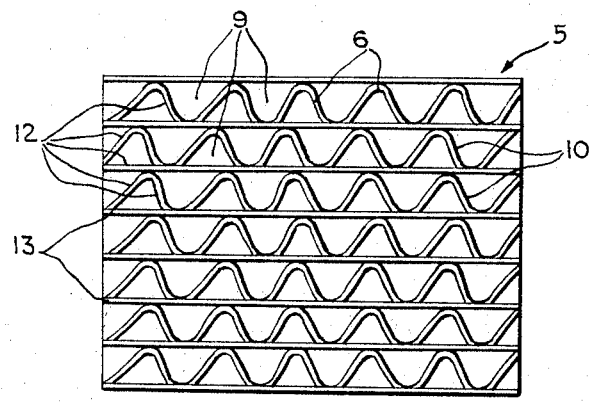
FIGURE 2 is a schematic transverse sectional view of a unitary porous refractory skeletal structure-supported catalyst for utilization in the ammonia converter or oxidation reactor of the flow sheet of FIGURE 1.
Figure 3:
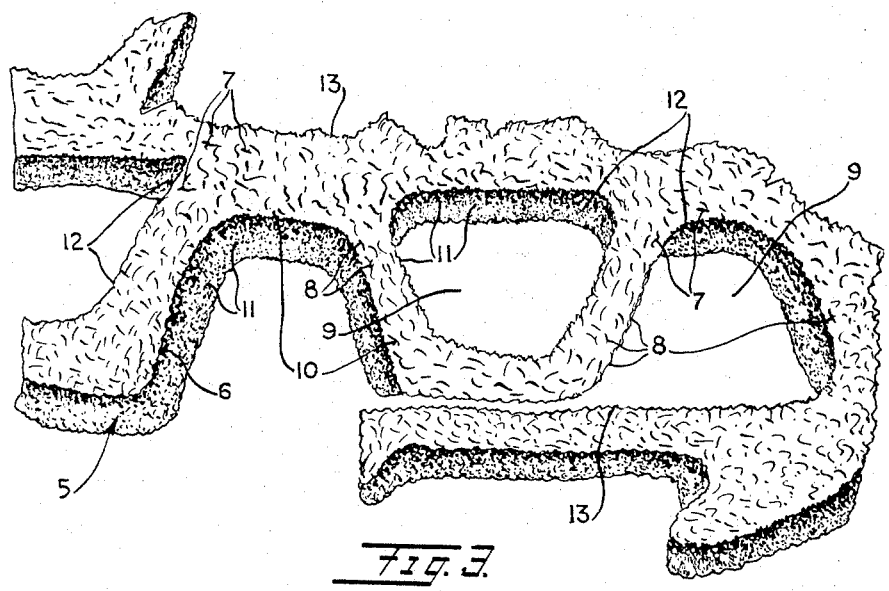
FIGURE 3 is a broken away enlarged transverse sectional view of another catalyst of this invention.

Referring to FIGURES 2 and 3, supported catalyst 5 comprises a catalytically inert unitary porous refractory skeletal structure 6 of zircon-mullite as support. Skeletal structure 6 has, as shown in FIGURE 3, pores 7 in its interior portion and also superficial macropores 8 communicating with gas flow channels 9 which extend through skeletal structure 6. Channels 9, as shown, are of generally trapezoidal shape in cross section and are defined by the corrugations 10 and generally horizontal layers 13 of the skeletal structure.

Catalytic metal 12 of platinum group metal, i.e. the platinum group metal per se or the platinum group metal alloy, is deposited directly on the unitary refractory skeletal structure 6 in the supported catalyst of FIGURE 2. In the supported catalyst of the FIGURE 3 embodiment, an activated refractory metal oxide, for instance alpha-alumina, is deposited as discontinuous deposits 11 on the surface of gas flow channels 9 and also on the surfaces of the superficial macropores which communicate with channels 9, and the platinum group metal catalyst is deposited on the activated refractory metal oxide. Some of the catalytic metal may also be deposited directly on the refractory skeletal structure surfaces in this FIGURE 3 embodiment. Macropores 8 of the skeletal structure are predominantly of size, i.e. diameter, in excess of 2,000 angstrom units.

Figure 1:
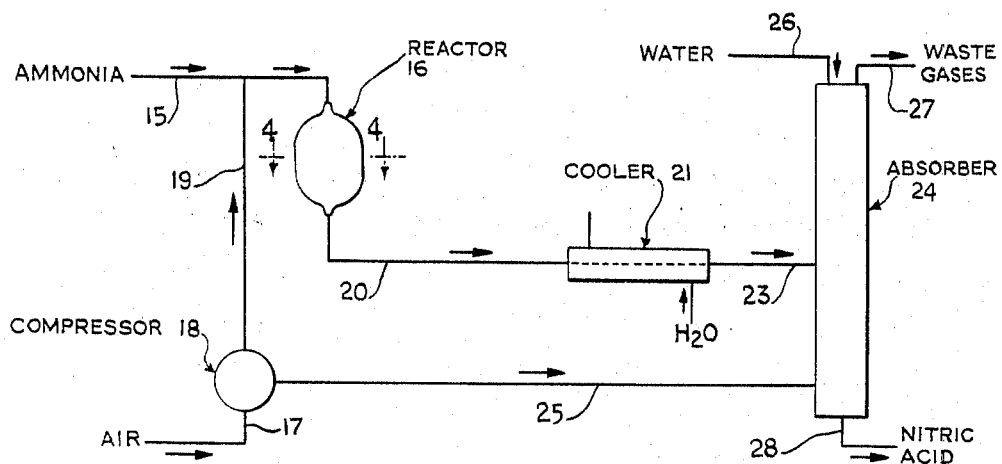
FIGURE 1 is a flow diagram of a system for the production of nitric acid in accordance with this invention.
Figure 4:
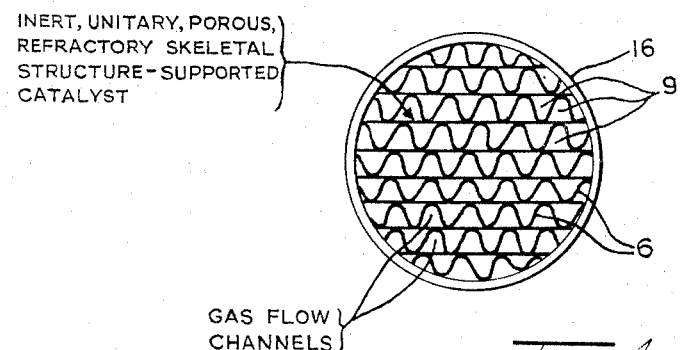
FIGURE 4 is a section taken on lines 4—4 of FIGURE 1.

Referring to FIGURE 1, ammonia gas is passed through conduit 15 into reactor 16, preheated air being supplied into admixture with the ammonia gas via conduit 17, compressor 18 and conduit 19. The air is passed into admixture with the ammonia in conduit 15 in amount sufficient to provide an amount of molecular oxygen in the admixture which is at least that required to stoichiometrically react with the $NH_3$ to form nitric oxide and water, in accordance with the equation previously set forth herein. The gaseous mixture of ammonia and air passes in contact within reactor 16 with the platinum group metal catalyst deposited on the surfaces of gas flow channels 9, as shown in FIGURE 4, and of macropores communicating therewith of the unitary refractory skeletal structure or "honeycomb" support 6 disposed within reactor 16 wherein the ammonia is oxidized to $NO+H_2O$. The temperature of the catalyst within reactor 16 is between about 650° C. and 1000° C. or higher due to the exothermic reaction and the pressure from about atmospheric to 110 p.s.i.g. and higher. The space velocity of the gaseous admixture through the flow channels of the supported catalyst in reactor 16 may range up to 1,000,000 cubic feet of gas per cubic foot of catalyst per hour. However there is but minimal pressure drop due to the unobstructed gas-flow channels of the catalyst.

The gas exiting at elevated temperature from reactor 16 through conduit 20 comprises a mixture of primarily $N_2$, NO, water vapor and $NO_2$, and this gas is passed into cooler 21 wherein its temperature is lowered appreciably by indirect heat exchange with cooling water or other suitable coolant. Some $NO_2$ is converted to $HNO_3$ in cooler 21 by reaction with condensed water therein in accordance with the reaction:

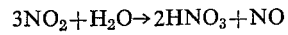

$$3NO_2+H_2O \rightarrow 2HNO_3+NO$$

Further some NO may be converted to $NO_2$ in cooler 21 by the reaction:

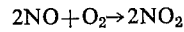

$$2NO+O_2 \rightarrow 2NO_2$$

From cooler 21, the mixture is passed through conduit 23 and introduced into a lower portion of absorber column or tower 24. Air is supplied from compressor 18 through conduit 25 and is also introduced into a lower portion of absorber 24. Absorber column 24 is equipped with trays and bubble caps or alternatively packed with acid-resistant packing, e.g. stoneware. Absorber 24 and other elements and vessels of the apparatus herein handling the corrosive acidic gases and liquid $HNO_3$ are constructed of an acid-resistant material, for instance stainless steel. Water is introduced into the upper portion of absorber 24 through conduit 26.

Nitric oxide is oxidized in absorber 24 to form $NO_2$ by reaction with excess oxygen from the air. The nitrogen dioxide passes upwardly within absorber column 24 in intimate countercurrent contact in the region of the bubble cap trays or packing (not shown) with the liquid water flowing downwardly therewithin, whereby the nitrogen dioxide is absorbed by the water forming nitric acid and releasing additional nitric oxide. The waste gases from absorber 24 are withdrawn through conduit 27 and, after preferably being first sent through a mist separator, may then be heated by indirect heat exchange with the hot effluent gases from reactor 16 in a suitable gas to gas heat exchanger (not shown) whence the hot gases can then be utilized for power recovery, for instance as motive fluid for operation of a gas turbine which in turn is coupled with the air compressor 18 for compressing the incoming air. Nitric acid of typically about 60% acid concentration is withdrawn from column 24 through conduit 28 and, after preferably being first bleached by contact with a countercurrent stream of air, is passed to storage.

The following examples further illustrate the invention. Percentages are by weight unless otherwise indicated.

EXAMPLE 1

A unitary skeletal structure-supported catalyst comprising 2% platinum group metal consisting of an alloy of 20% Rh and 80% Pt dispersed on the surfaces of gas flow channels and superficial macropores communicating therewith of a corrugation porous refractory ceramic cylinder of α-alumina was installed in the ammonia converter or oxidation reactor of a 1 ton/day nitric acid pilot plant. The corrugated porous cylinder had dimensions of 3⅜" diameter and 1⅞" length and 10 corrugations per inch which defined 20 straight-through unobstructed gas flow channels per inch. The cylinder was installed in the converter in such fashion that the gas flow channels extended in the direction of gas flow.

A gaseous mixture of, by volume, about one part anhydrous ammonia and 9 parts air was fed at a high space velocity into the converter and through the gas flow channels in the corrugated cylinder supported catalyst. The gaseous mixture was preheated to about 200° C. prior to being introduced into the converter. The conditions within the converter was a temperature at the catalyst of about 925° C. and a pressure of about 110 p.s.i.g. The catalyst showed excellent activity for oxidizing the ammonia to nitric oxide.

EXAMPLE 2

The purpose of this example is to compare a Pt-Rh gauze catalyst of the type conventionally used for oxidation of $NH_3$ in $HNO_3$ production with a catalyst of this invention.

Part A

A Pt-Rh gauze catalyst of the type conventionally used as catalyst in a converter of a nitric acid plant for catalyzing the oxidation of ammonia, and comprising 10 layers of 80 mesh 0.003" diameter wire of 90% Pt–10% Rh alloy was used as catalyst in a reactor for $NH_3$ oxidation. The weight of precious metal was 8.94 g. The feed to the reactor consisted of about 9% to 10% by volume $NH_3$ and the balance air. The temperature at the catalyst ranged from about 850° C. to 970° C. and the pressure within the reactor from about atmospheric to 10 p.s.i.g. The $NH_3$ flow was recorded upstream of the catalyst and the percent by volume of oxides of nitrogen was determined in the effluent gas downstream from the catalyst. The results of the test are set forth hereinafter in Table I.

Part B

A catalyst in accordance with this invention, comprising 0.84 g. of an alloy of 90% Pt–10% Rh deposited as a thin conductive coating on a coating of activated alumina which in turn was deposited on the surfaces of the gas flow channels and macropores communicating therewith of a zirconmullite unitary porous skeletal structure support having 400 inlet openings for the gas flow channels per square inch and the same number of gas flow channels per square inch, was used in the same reactor as Part A and under the same conditions. The results of the test are shown in Table I below.

TABLE I

| Catalyst | Catalytic Metal Content, g. | Total Gas Flow | Upstream, NH₃ Flow | WHSV | Downstream, NO+NO₂ (dry) |
|---|---|---|---|---|---|
| Conventional 90% Pt, 10% Rh Gauze (10 layers 80 mesh, 0.003" wire diameter). | 8.94 | 144 NCFH | 13.45 NCFH | 32.4 | 11.20% by vol. |
| Unitary Porous Ceramic Skeletal Structure, Supported 90% Pt, 10% Rh Catalyst of This Invention Having 400 Gas Flow Channels/sq. in. | 0.84 | 144 | 13.46 | 345 | 11.55% by vol. |

NOTE.—NCFH = Cubic feet per hour at 0° C. and 1 atm.
WHSV = Weight hourly space velocity or weight of NH₃ per hour/weight of precious metal.
The oxides of nitrogen were determined as HNO₃ and referred to on a dry gas basis.

The data of the table show that the catalyst of this invention enabled a weight hourly space velocity of NH$_3$, i.e. as WHSV, about 10 times that of the conventional catalyst. For roughly the same conversion, which approached the theoretical maximum, the Pt-Rh content of the entire unitary porous ceramic skeletal structure-supported catalyst of this invention was only 1/10 of the Pt-Rh content of the gauze. In addition, a materially lower pressure drop was experienced with the unitary porous ceramic skeletal structure-supported catalyst of this invention.

What is claimed is:

1. A process for the production of nitric acid, which comprises admixing gaseous ammonia and atmospheric air, the air being present in the resulting gaseous admixture in amount sufficient to provide at least the stoichiometric amount of oxygen required to react with the ammonia to form nitric oxide, passing the said gaseous admixture into an oxidation zone having a catalytic contact mass through which the gaseous admixture flows, said catalytic contact mass comprising an inert unitary refractory structure having a plurality of gas flow channels extending in the direction of gas flow and a multiplicity of accessible superficial macropores communicating with the channels, said macropores being predominantly of a size in excess of 2,000 angstrom units, said skeletal structure being the support for a platinum group metal catalyst which is deposited on the surfaces of the gas flow channels and of the macropores, oxidizing the ammonia in said oxidizing zone at a temperature in the approximate range of 650° C. to 1000° C., cooling the gaseous reaction products including nitric oxide, nitrogen dioxide, water vapor and nitrogen in a cooling zone, introducing the gaseous reaction products from the cooling zone into a lower portion of an absorber zone while simultaneously introducing air into the lower portion of the absorber zone, and introducing liquid water into an upper portion of the absorber zone for absorbing the nitrogen dioxide in the gaseous reaction products to form nitric acid, whereby said reaction of ammonia with oxygen may be effected at higher space velocities up to 1,000,000 cubic feet of gas per cubic foot of catalyst per hour, based on standard conditions of temperature and pressure.

2. The process of claim 1 wherein the platinum group metal catalyst is in the form of a thin conductive layer on the surface of the inert unitary refractory skeletal structure.

3. The process of claim 1 wherein an activated refractory metal oxide is deposited on the surfaces of the gas flow channels and of the superficial macropores, and the platinum group metal catalyst is deposited on the activated refractory oxide.

References Cited

UNITED STATES PATENTS

| 2,955,917 | 10/1960 | Roberts et al. | 23—162 |
| 2,970,034 | 1/1961 | Andersen et al. | 23—162 XR |
| 2,975,025 | 3/1961 | Cohn et al. | 23—162 XR |
| 3,003,851 | 10/1961 | Winn | 23—162 |
| 3,079,232 | 2/1963 | Andersen et al. | 23—162 XR |
| 3,136,602 | 6/1964 | Berger | 23—162 XR |
| 3,208,131 | 9/1965 | Ruff et al. | |

FOREIGN PATENTS

| 464,706 | 4/1937 | Great Britain. |
| 882,484 | 11/1961 | Great Britain. |

OSCAR R. VERTIZ, *Primary Examiner.*

BENNETT H. LEVENSON, *Assistant Examiner.*

U.S. Cl. X.R.

252—477